(12) United States Patent
Grimm et al.

(10) Patent No.: US 7,849,019 B2
(45) Date of Patent: Dec. 7, 2010

(54) METHOD AND ARRANGEMENT FOR MANAGING LICENSES

(75) Inventors: Olaf Grimm, Paderborn (DE); Thomas Hanna, Detmold (DE); Michael Karrengarn, Münster (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 620 days.

(21) Appl. No.: 11/901,650

(22) Filed: Sep. 18, 2007

(65) Prior Publication Data

US 2008/0082450 A1 Apr. 3, 2008

(30) Foreign Application Priority Data

Sep. 18, 2006 (EP) .................... 06019504

(51) Int. Cl.
*G06F 21/00* (2006.01)
(52) U.S. Cl. .............. 705/59; 705/50; 705/51; 705/57; 380/201; 380/202; 380/203; 380/204; 726/1
(58) Field of Classification Search .......... 705/50, 705/51, 57, 59; 726/1–36; 380/201–204
See application file for complete search history.

(56) References Cited

U.S. PATENT DOCUMENTS

| | | |
|---|---|---|
| 5,204,897 A | 4/1993 | Wyman |
| 5,752,041 A | 5/1998 | Fosdick |
| 6,056,786 A | 5/2000 | Rivera et al. |
| 6,859,792 B1 | 2/2005 | Marjadi et al. |
| 7,363,318 B1 * | 4/2008 | Dere et al. .............. 1/1 |
| 2003/0084306 A1 * | 5/2003 | Abburi et al. ........... 713/188 |
| 2006/0085350 A1 | 4/2006 | Samayamantry et al. |
| 2006/0242082 A1 * | 10/2006 | Margalit et al. ............ 705/59 |

FOREIGN PATENT DOCUMENTS

| | | |
|---|---|---|
| EP | 1 505 528 A1 | 2/2005 |
| JP | EP 1505528 A1 * | 5/2003 |
| WO | WO 01/18710 A2 | 3/2001 |

OTHER PUBLICATIONS

FLEXLM User's Manual—Dec. 2000. http://web.njit.edu/topics/Prog_Lang_Docs/html/flexlm/all.htm. Retrieved online Sep. 14, 2010.*

* cited by examiner

*Primary Examiner*—James A Reagan

(57) ABSTRACT

The number of releasable licenses is registered in a first entity, the resource to be used being attributed and/or having withdrawn from it, by a second entity, a releasable license for use which is registered in the second entity and/or a license. In a synchronization step the difference between the number of licenses allocated for use since a previous synchronization step and the licenses released again in this time is repeatedly reported from the second entities to the first entity respectively, this difference being taken as a basis for reducing or increasing the number of releasable licenses registered in the first entity, and conversely the resultant number of releasable licenses is reported from the first entity to the second entity and is registered there as the number of releasable licenses.

24 Claims, 6 Drawing Sheets

METHOD AND ARRANGEMENT FOR MANAGING LICENSES

CROSS REFERENCE TO RELATED APPLICATIONS

This application claims priority of European Patent Office application No. 06019504.7 EP filed Sep. 18, 2006, which is incorporated by reference herein in its entirety.

FIELD OF INVENTION

The invention relates to a method and to an arrangement for managing licenses in accordance with the independent claims.

BACKGROUND OF INVENTION

With technical equipment and arrangements, it is frequently the case that use of a resource requires a license for use. Thus, by way of example, the purchase of a data storage medium with a computer program does not automatically have the associated "authorization" to actually use this computer program. Another common example of the use of licenses are modern communication systems, which the manufacturer equips with a particular number of resources, for example interfaces, channels, services etc. In this case, a number of licenses which is purchased by a user determines the scope of permitted use of the resources provided by the manufacturer in advance. In this context, the term "resource" has a very broad sense within the scope of this patent application and denotes any technical facility, service, function, computer program or the like whose use requires use authorization, that is to say a license.

Ideally, a manufacturer provides its customers with precisely as many resources and an identical number of licenses as the customer actually requires. In the example of communication installations, this would mean that a customer operating 20 extensions would also be supplied with a communication installation having 20 subscriber interfaces and naturally also with a license for operating the 20 subscriber interfaces (and hence for the use of 20 channels). In this example, however, this has the drawback that as the customer's needs increase it is necessary to retrofit both individual resources (in this case: physical subscriber interfaces) and the use licenses required for operation. This is disadvantageous both from a logistical point of view and from a technical point of view. Therefore, technical facilities, that is to say including the communication installations under consideration here, are often "over proportioned" in terms of their resources, i.e. twenty-four or thirty resources (subscriber lines) are supplied instead of the originally required twenty resources, for example, but only twenty licenses. Extending the telecommunication installation then merely requires the purchase of further licenses and the associated "enabling" of the additional resources already provided in advance. Another example are computer programs which are sold in a full version on a data storage medium or can even be loaded from the Internet but whose use requires the purchase of what is known as an "enable code" (installation key) and hence the purchase of a license. Depending on the enable code (type of license), a greater or lesser scope of functions of the computer program is enabled for the customer in this case. This means that in this example too the resources (in this case: functions of the computer program) are with the customer from the outset (provided in advance) but cannot be used until a license is granted. In brief, the use of licenses is an instrument for releasing or blocking services, that is to say resources, as required.

As an example of a license-based use scenario, a communication network having three communication nodes will now be assumed, with each communication node needing to have a license to use each channel (that is to say for each telephone call, for example). If thirty terminals are connected to each of the three communication installations, thirty licenses can be allocated for each communication installation, for example. This would have the advantage that sufficient licenses for the resources (in this case: channels) are always available, and in each communication installation, even if all the subscribers are making telephone calls at the same time, in other words: are using their resources. However, such a setup would have the drawback for the operator of the communication network that he would need to purchase ninety licenses, even though it is extremely unlikely that all ninety subscribers would actually be making telephone calls at the same time and hence is highly likely that it is not actually necessary to purchase such a large number of licenses. To solve the problem, it is naturally possible to reduce the number of licenses for each communication installation, for example to halve it. However, the situation may then arise that in a first of the communication systems, for example, the number of granted licenses is not sufficient while another of the communication systems has free, unused licenses. The result of this would be that a function is not possible at a first location on account of "a lack of licenses", even though sufficient licenses are available in total.

SUMMARY OF INVENTION

To solve this "distribution problem", it is known practice to use licenses flexibly always precisely at the point at which they are currently needed; reference is also made to a "floating licenses" concept or else to "central licensing". This is generally done by using a central entity, what is known as a "licensing server", which holds all the licenses available (releasable) for the network or the arrangement. As soon as a resource needs to be used (in the example above, this would be: as soon as a channel needs to be used), this resource or the technical facility providing this resource (in this case: communication installation) sets up a connection to the license server and obtains a free license therefrom for the duration of use. As soon as the resource is no longer being used, this license is released again by fresh data interchange with the license server, so that this license is available to the other resources again. This practice has the advantage that not every communication installation in the network needs to hold a maximum number of licenses for safety reasons, that is to say for the case of an extraordinarily high utilization level, but rather the available licenses can be used flexibly for various resources or at various locations. However, the drawback of the outlined method is that the network load in a network rises as a result of the constant allocation and re-release of licenses. In addition, if a central license server has a fault or is unattainable, the functionality of the entire network can be severely restricted.

It is therefore an object of the present invention to make the attribution of licenses to resources more flexible and to improve the dependability of arrangements with central licensing.

The object is achieved by a method and by an arrangement in accordance with the independent claims.

The solution to the problem provides a method for managing licenses, where for the use of a resource a license is attributed to this resource, and where this license is released again following use of the resource. In this case, a first central entity registers the number of releasable licenses, a second entity attributes the resource to be used a releasable license for use which is registered in said second entity, and/or a license attributed to the resource by this second entity is registered as releasable again in the second entity when it is not being used. In a synchronization step the difference between the number of licenses allocated for use since a previous synchronization step and the licenses released again in this time is repeatedly reported from the second entity to the first entity, this difference being taken as a basis for reducing the number of releasable licenses registered in the first entity, and conversely the resultant number of releasable licenses is reported from the first entity to the second entity and is registered there as the number of releasable licenses. This method ensures that following the conclusion of the synchronization step the second entity has available the releasable licenses currently available in an arrangement, and when there are a plurality of second entities, each of these second entities has available the releasable licenses to the full extent. As a result, it is possible for each second entity to access all releasable licenses even in the cases in which connection to the first entity (central entity) is not possible or is possible only to a restricted degree.

The solution to the problem also provides an arrangement for managing licenses, having a plurality of resources, where for the use of a resource said resource is respectively attributed a license for the duration of its use. In this case, means are provided in order to attribute one of the licenses from a stock of releasable licenses to a resource which is to be used and, following use of the resource, to reattribute the license which is no longer needed to the stock. The arrangement is provided with a first entity having a first database for registering the releasable licenses. In addition, the arrangement is provided with a plurality of second entities having second databases for managing the releasable licenses, the second entities being set up to perform a synchronization step with the first entity, and the second entities being set up to allocate licenses to the resources and to re-release licenses which are no longer being used. In this case, the first entity and the second entities are set such that upon performance of a synchronization step between the first entity and one of the second entities, in a respective first substep the second entity reports to the first entity at least the difference between the number of licenses allocated since the last synchronization and the number of licenses re-released since the last synchronization. The entities are also set up such that in a second substep of the synchronization the central entity reduces or increases the number of releasable licenses registered there by the reported difference, and in a third substep the central entity transmits the number of releasable licenses which has been freshly ascertained in this manner to the second entity, the second entity being set such that this freshly ascertained number of releasable licenses in the second entity replaces the number of releasable licenses which was registered there previously. Such an arrangement advantageously ensures that the reaction time between the application for a license and the allotment of a license to a resource is reduced because it is not necessary to set up a connection to a central license server, that is to say to the first entity, for each license allocation. Furthermore, such an arrangement has the releasable licenses available for all second entities simultaneously, the means for the synchronization step achieving the aim that the databases in the second entities are respectively brought into line with the first entity. In such an arrangement, it is furthermore possible for a large number of resources to be provided with licenses in the case of "load peaks" even if there are now only a few releasable licenses free in the overall arrangement. This avoids the need for the overall arrangement to hold an unnecessarily large number of releasable licenses for safety reasons.

Advantageous refinements of the inventive method are specified in the dependent patent claims. The features and advantages shown therein can also be applied analogously to the inventive arrangement.

If the synchronization step is repeatedly performed in succession with each of the second entities, it is guaranteed, on statistical average, that the enableable licenses respectively registered in the second entities correspond to the number of releasable licenses registered in the first entity. If no releasable licenses are attributed to the resources or licenses are returned by the resources in the mean time, after a dual synchronization cycle the value stored in each second entity for the releasable licenses even corresponds precisely to the relevant value in the first entity. This means that it is guaranteed that for an overall arrangement essentially only the number of licenses required on statistical average needs to be held.

If the resource to be used, before it is used or at the start of its use, prompts allotment of a license by a second entity to which this resource is attributed, and if, in this case, the second entity, in cases in which at least one enableable license is registered in a second entity, allots this license to the resource and this license is blocked for further resources until this license is released again by the resource using it, then it is guaranteed that a second entity attributes each releasable license only to a single one of the resources at the same time, which prevents multiple allocation of a releasable license within one and the same second entity.

It is advantageous if various types of resources are defined, in which case various license types are defined for the various resource types and these licenses of various type are managed by the first entity and by the second entities, in each case separately from one another. This means that different resources with different licenses can be linked to one another via the same first and second entities.

It is advantageous if the synchronization step is repeatedly performed in a prescribed time frame. The prescribed time frame can therefore influence the network loading on a network directly, with shorter synchronization steps shortening the period in which licenses can be released beyond the actual number of releasable licenses, but also resulting in a higher network loading through the synchronization data. In this case, it is advantageous if, in cases in which the number of registered releasable licenses in the first entity and/or in at least one of the second entities is below a predefined threshold value, the synchronization step is performed more frequently than prescribed in the time frame. This ensures that re-released licenses are reported back in the shortest time possible not only to that second entity to which this license has been returned but also in real time to the first entity and hence are reported to the subsequently synchronized second entities again.

A uniform utilization level for the second entities can be achieved by virtue of each resource being attributed to precisely one of the second entities. In this case, additional substitute attributions can advantageously be made which apply to the situation in which one or more of the second entities fail.

The first entity and/or the second entities can be preset such that for a predefined period the number of licenses in use can exceed the number of registered releasable licenses. This makes such an arrangement "overload tolerant" avoiding malfunctions as a result of unusable resources in the event of load peaks. If this predefined period is the period up to conclusion of the next synchronization step, inputting a single time constant, namely the synchronization interval, allows good control of the overload response of an arrangement based on the invention. What are known as "fuzzy-logic" strategies may advantageously be used to control the license volume in this case.

BRIEF DESCRIPTION OF THE DRAWINGS

Exemplary embodiments of the inventive method are explained below with reference to the drawings. These are simultaneously used to explain an exemplary embodiment of the inventive arrangement.

In the drawings.

DETAILED DESCRIPTION OF INVENTION

Figure 1:
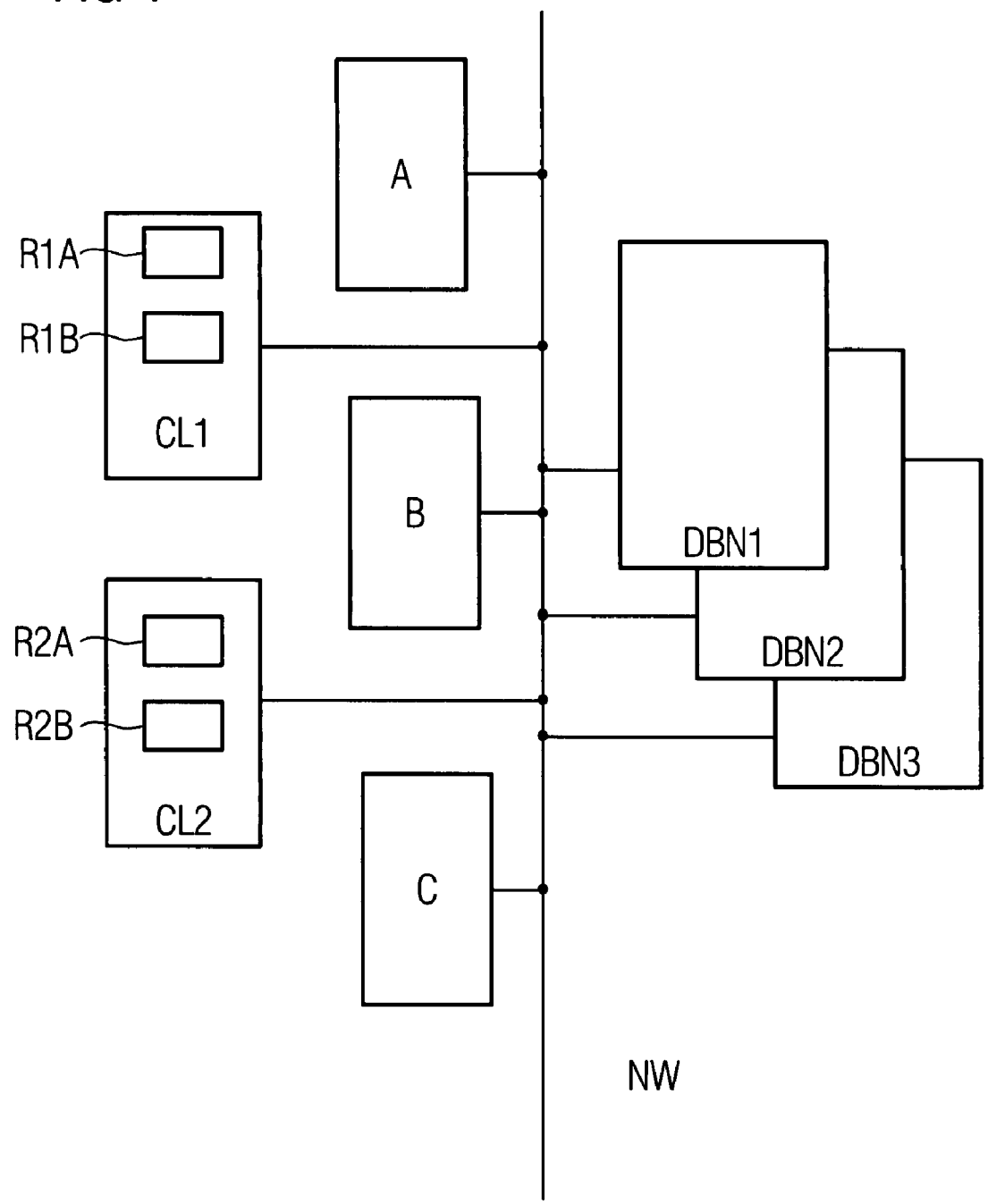
FIG. 1 shows an arrangement comprising a plurality of database nodes, a plurality of application nodes and a plurality of client systems with resources.

FIG. 1 schematically shows an arrangement comprising a network NW (communication network, data network, intranet, Internet or the like) with database nodes DBN1, DBN2, DBN3, with application nodes A, B, C, with client systems CL1, CL2 and with resources R1A, R1B, R2A, R2B. The schematically shown components in this instance constitute what is known as a "distributed arrangement" (distributed system), with the individual components being able to be arranged with free "mobility", that is to say at any location, in the network NW. This applies particularly to the database nodes DBN1, DBN2, DBN3, which logically form a single database but for reasons of load distribution and for reasons of redundancy (failsafety) are physically distributed over various hardware units. Equally, although FIG. 1 shows the resources R1A, R1B as belonging to the client system CL1—in line with the resources R2A, R2B for the client system CL2—the resources under consideration here may likewise be arranged on various and also totally different hardware platforms.

The resources R1A, R1B, R2A, R2B are functions ("services") which can be used within the context of the distributed system, which is also known as SOA (Service Orientated Architecture), in clients or by clients. In the present exemplary embodiment, these are communication channels which can be used in a telephony arrangement; it goes without saying that any other service, an arbitrary functionality or an appliance may also be considered as a "resource". For each telephone call which he wishes to make, a subscriber needs to use such a channel for transmitting his call. Such a communication channel is used using what is known as a protocol stack (e.g. what is known as an "SIP stack"—for Session Initiation Protocol). However, such a protocol stack can only be used if the license holder for this protocol stack grants authorization to do so, in other words: grants a license for use. In the present exemplary embodiment, it is first of all assumed that the operator of the arrangement shown has purchased a license for the simultaneous operation of 20 resources R1A, R1B, R2A, R2B. In this case, the resources R1A, R1B, R2A, R2B in FIG. 1 are shown as representative of a very much larger number of resources of the same type (in this case: protocol stacks).

For the discussion of the method based on the invention or the arrangement based on the invention, it is of no significance in or by which of the client systems CL1, CL2 one of the resources R1A, R1B, R2A, R2B is to be used. For this reason, the resources R1A, R1B, R2A, R2B are not shown further in the figures which follow. The text below therefore always uses the term "resource" in a general sense.

The use of a resource requires—as already explained—a respective license, a license only ever being able to be allotted to a particular number (in this case, precisely 1) of using resources at the same time. That is to say that before a resource is used or at the start of use of a resource, this resource needs to be attributed one license from a stock of available ("releasable") licenses and said license should be made available to the "license pool" again following conclusion of the use of the resource. In this case, each resource is attributed to one of the application nodes A, B, C. Each resource which is to be used obtains the license required for use from the associated one of the application nodes A, B, C for the period of use. In this case, it is either possible for the resource to request the license from the application node A, B, C automatically or else for the process of license allotment to be performed by an external entity (not shown). Within the application nodes A, B, C, the licenses are respectively managed by a special computer program, known as the "resource broker". The central instrument for managing the licenses, will be referred to below as the "resource store" RS; this first, central entity "resource store" RS can—as already described—be formed by a multiplicity of database nodes DBN1, DBN2, DBN3. The resource store RS is that central point at which licenses for the use of the resources can be added to or removed ("deleted") from the entire communication arrangement. FIGS. 1A to 7 now schematically show only the application nodes A, B, C with the number of releasable and allocated licenses "buffer stored" there and also (respectively on the right hand side of the figure) the resource store RS with the licenses registered there.

In one alternative embodiment, the resources are not located on the client systems CL1, CL2 but rather at other nodes, for example directly at the application nodes A, B, C. It goes without saying that in these cases it is not necessary to access the network NW in order to obtain or release a license, provided that the relevant resource is installed at the same application node A, B, C at which the resource brokes associated with this resource is arranged.

Figure 2A:
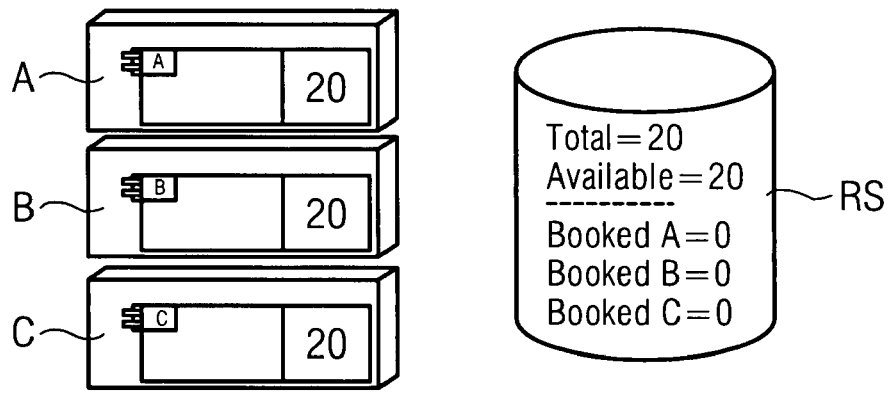
FIG. 2 shows the distribution of releasable and allocated licenses during various load states.

In the text below, it is assumed that 20 releasable licenses have been set in the resource store. For the sake of simplicity, it is assumed that all resources under consideration require licenses of the same type; otherwise, each resource type or each associated different license type would need to be considered separately. In this regard, the right-hand part of FIG. 2A schematically shows the resource store RS, the statement "total=20" indicating that 20 licenses are being managed in total. In addition, the statement "available=20" indicates that of the 20 licenses managed there are 20 which can be released, that is to say that at first there are no licenses being used.

The resource brokers for the application nodes A, B, C are shown in the left-hand part of FIG. 2A. These perform a respective synchronization step with the resource store RS at stipulated, configurable intervals of time. In addition, a synchronization step of this type is also performed when each resource broker is engaged afresh, the resource brokers respectively setting up a connection to the resource store RS. In this synchronization step, each resource broker reads the number of releasable licenses (in this case initially: "available=20") from the resource store RS and stores this statement. These statements "20" are respectively shown in the left-hand part of FIG. 2A.

Figure 2B:
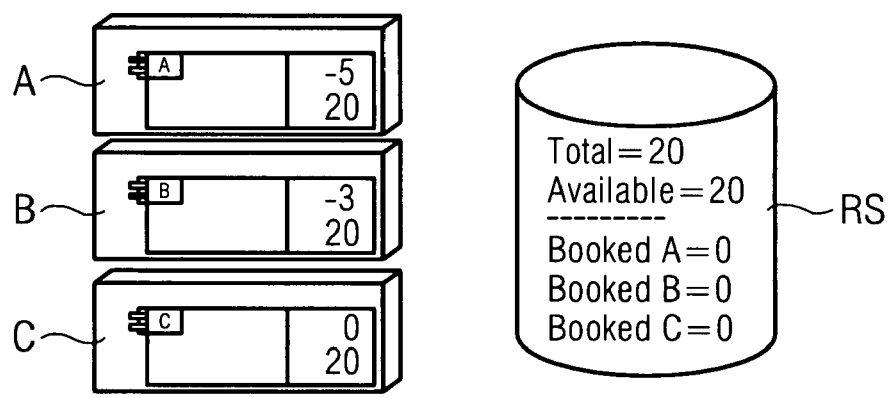

The text below considers a period of time in which no further synchronization step takes place. In this period of time, various resources request licenses from their respective associated resource brokers. It goes without saying that if a resource broker fails or if the relevant application node A, B, C is unattainable then a resource can switch to another of the resource brokers from another of the application nodes A, B, C. The resource broker for the application node A books five licenses, the application node B books three licenses and the application node C initially does not request a license. The resultant state is shown in FIG. 2B. In the diagram, the number of licenses allocated since the last synchronization step is entered on the right-hand side of the respective resource broker in the top column; in the column below that, the number of releasable licenses is also recorded, as known from the description relating to FIG. 2A. This number is not changed at first by the mere allocation of licenses.

In this case, the difference between the number of allocated licenses and the number of releasable licenses gives that number of licenses which could still be allocated by the respective resource broker; fifteen licenses in the case of the application node A, seventeen license in the case of the application node B and the original 20 licenses in the case of the application node C.

Figure 2C:
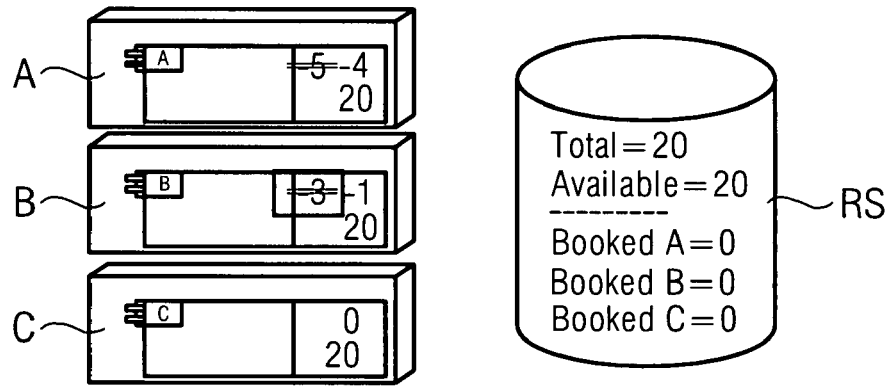

The situation shown in FIG. 2C is obtained when one license is returned again "released" to the resource broker for the application node A and two licenses are returned again ("released") to the resource broker for application node B. Accordingly, the respectively stored number of allocated licenses is reduced.

The text below describes the changes which are obtained as a result of a synchronization cycle. In this case, the resource broker for the application node B is first of all synchronized. In the present exemplary embodiment, it is left to chance which of the resource brokers is synchronized first, because in the present case it is dependent on which of the application nodes have been engaged first. For the order and for the frequency of the synchronization steps, however, the widest variety of scenarios and practices is conceivable. The synchronization step for the resource broker for application node B is shown schematically in FIG. 3A. In a first substep, the relevant resource broker transmits the balance of the licenses which it has allocated since the last synchronization step to the resource store RS. Since this is the first synchronization step in the present case, this is equal to the balance since the resource broker for the application node B was engaged or restarted. Since this application node B has initially allocated 3 licenses and then two resources have been deactivated again and hence two licenses have been returned (released), this balance is "−1". This reduces the number of available, releasable licenses in the resource store RS by 1 to "19"; this value is transmitted to the resource broker for the application node B in the second substep of the synchronization step and is entered there instead of the "20" as the new value for the number of releasable licenses. At the same time, the new "balance" for the number of releasable licenses in this resource broker is reset to zero, because the resource broker is now fully synchronized.

Figure 3A:
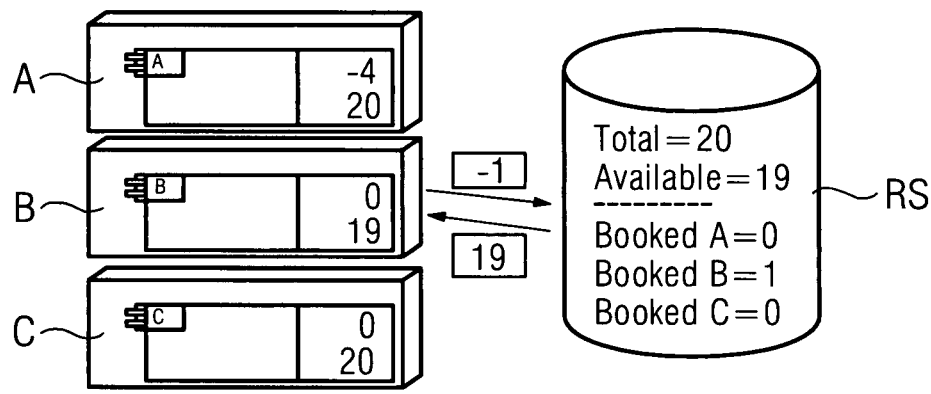
FIG. 3 shows a schematic illustration of a data transfer during a synchronization step.
Figure 3B:
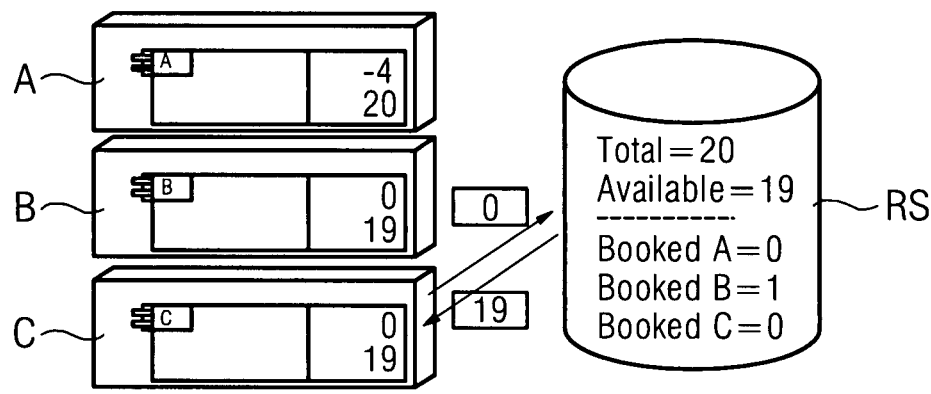
Figure 3C:
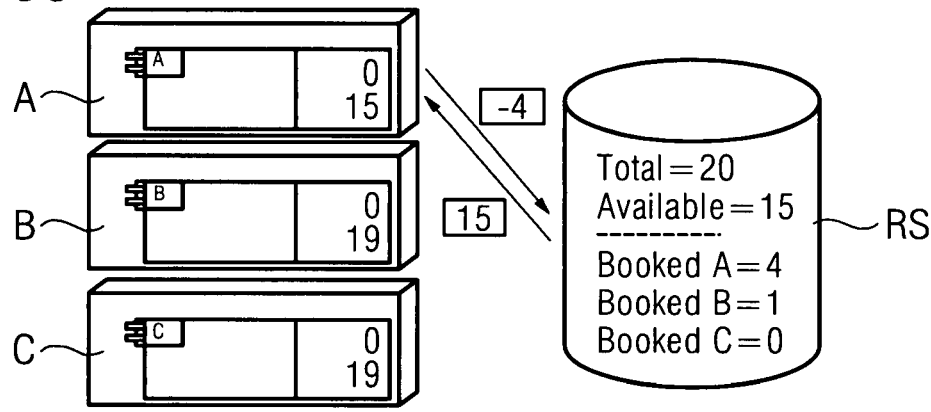
Figure 3D:
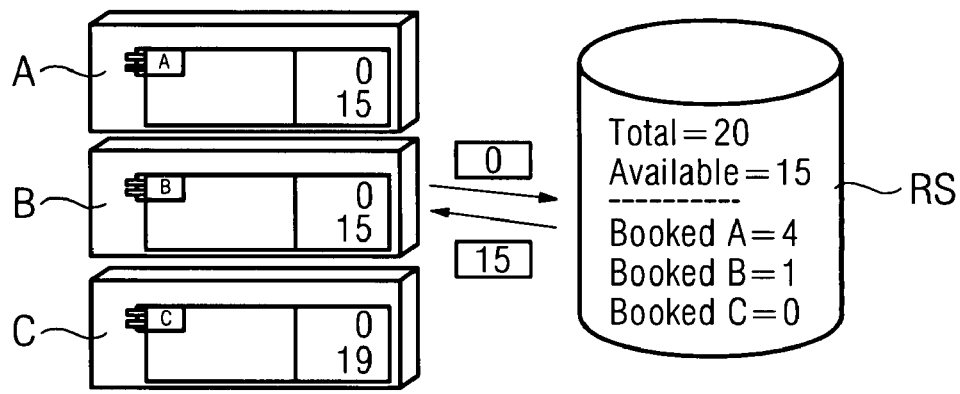
Figure 3E:
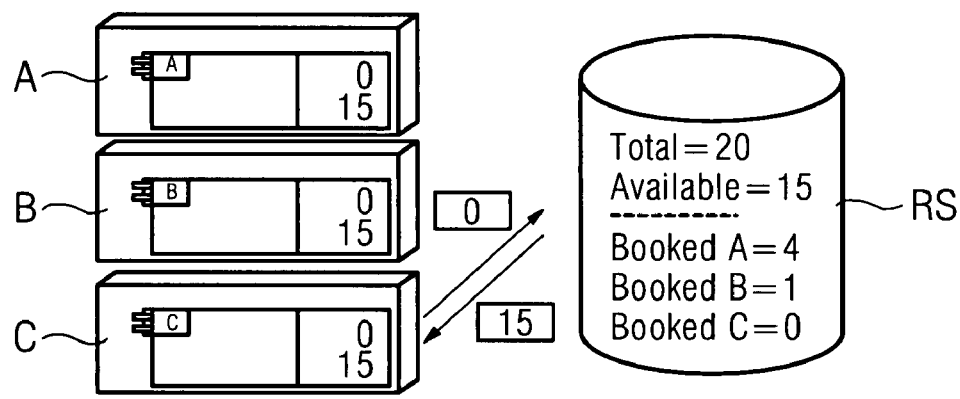

FIG. 3B shows how the next resource broker for the application node C is synchronized. The result obtained in this case is likewise a new value for the number of releasable licenses "19". Finally, the resource broker for the application node A is also synchronized; this process is shown schematically in FIG. 3C. In FIGS. 3A, 3B and 3C, it can be seen that the number of licenses respectively allocated ("booked") by the individual resource brokers is recorded in the resource store RS. It follows from this that besides the total number of licenses ("total=20") it is not imperative to store the number of releasable licenses ("available=15") in FIG. 3C; this value can also be recalculated at any time from the total number and from the individual values ("booked A=4; B=1; C=0"). FIG. 3C shows that the four licenses which have been allocated by the resource broker for the application layer A are taken as a basis for re-stipulating both the number of releasable licenses in the resource store RS and the corresponding value in the resource broker for the application node A as "15". This value initially remains at the value "19" for the other resource brokers because a fresh synchronization step has not yet been performed with these. That is to say that for these two remaining resource brokers there continue to be nineteen licenses available even though there are in fact now only fifteen licenses left from the total number of "20". This state continues to exist until the synchronization steps shown in FIGS. 3D and 3E have been performed. In the meantime, it is possible for more than the "permitted" twenty licenses to be allocated. Provided that no resources are used or released in the meantime, and hence the licenses linked to these resources are allocated or released, it therefore takes a maximum of two full synchronization cycles before all the resource brokers are fully in sync with the resource store RS. In the meantime, more resources than there is provision for by the total number of releasable licenses may be used without a resource being denied a license.

Figure 4:
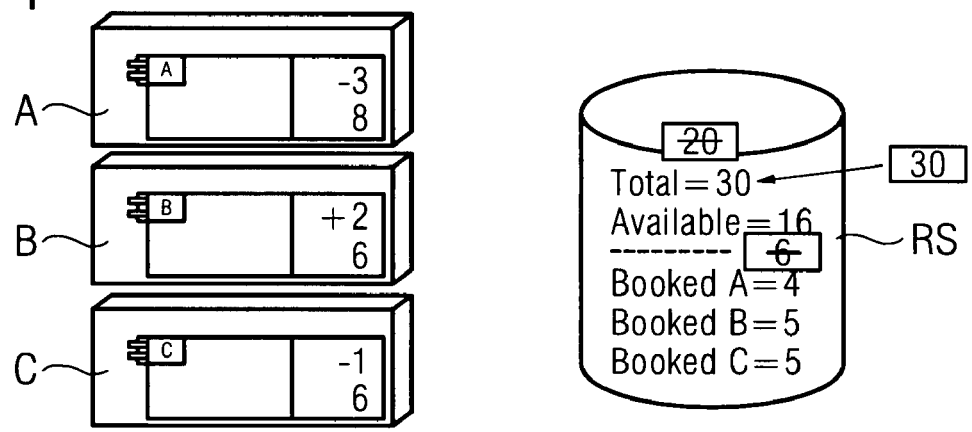
FIG. 4 shows the addition of releasable licenses to the arrangement.

FIG. 4 shows a scenario in which there are initially 20 licenses in total stored in the resource store RS, six of which are still available ("available=6"). If the operator of the arrangement purchases ten further licenses, these ten licenses are reregistered only at a single location, namely in the resource store RS. This increases the number of licenses to thirty ("total=30"), on the basis of which the number of releasable licenses is recalculated ("available=16"). This number is transferred to the respective synchronized resource broker in each subsequent synchronization step. The procedure is similar when licenses are withdrawn from the network or the arrangement. It should be noted that the practice described, using repeated synchronization cycles, means that on statistical average all resource brokers have an identical number of releasable licenses, regardless of how many licenses have already been allocated and withdrawn again by the respective resource broker. Alternatively, the resource store RS can also have instructions added which prompt an uneven distribution of the releasable licenses, for example on the basis of authorizations which are associated with the various application nodes and their users.

The method described is known to have the advantage that each application node A, B, C, or each resource broker respectively has a large number, ideally even the respective actual number, of releasable licenses available without the need to set up a respective connection to the resource store RS for the purpose of allocating licenses. Accordingly, licenses can be allocated and licenses can be released quickly and also safely. Furthermore, it is guaranteed that in cases in which releasable licenses are generally present in the overall arrangement it is possible for licenses to be freely allocated everywhere within the context of this number and hence also for peak loads, which can go beyond the total number of licenses, to be "cushioned". This firstly means that the number of licenses to be held in the system does not need to be much greater than the number of licenses required on average, without losing the capability of handling load peaks. On the other hand, this has the drawback that in extreme cases (worst case scenario) the number of licenses allocated may even exceed a multiple of the total number of available licenses (releasable licenses), depending on the number of resource brokers, on the basis of the time interval for the synchronization steps or synchronization cycles and on the basis of the use behavior (that is to say the use of resources).

Figure 5A:
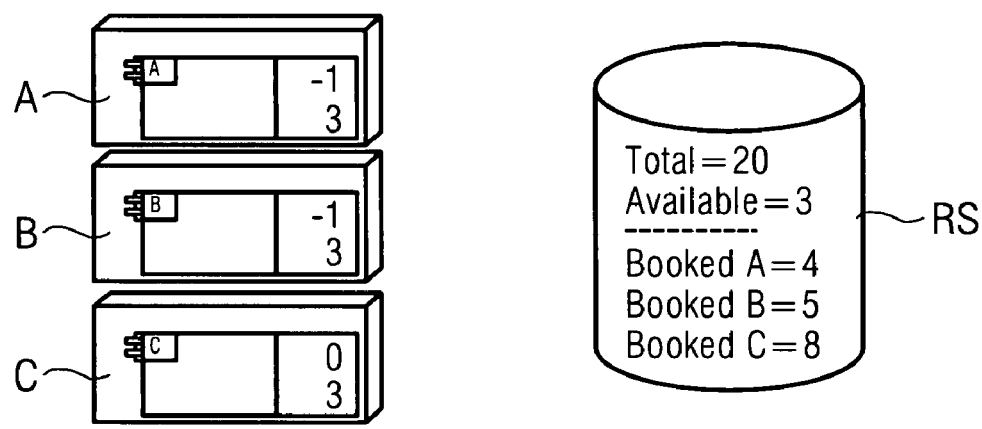
FIG. 5 shows the situation in the event of undersupply with releasable licenses.
Figure 5B:
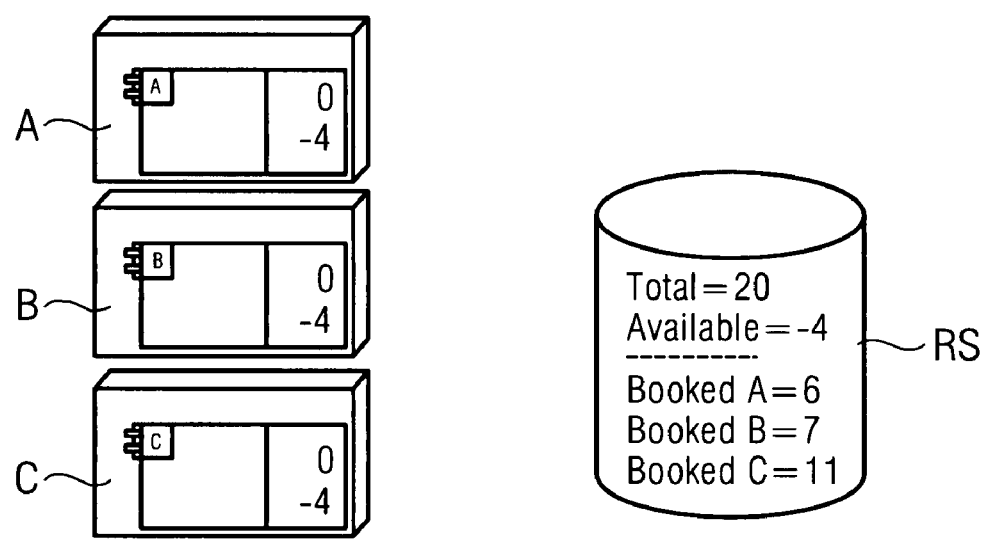

FIG. 5A shows the starting point for such a worst case scenario. The number of releasable licenses in a total number ("total=20") has been reduced to three releasable licenses ("available=3"), because seventeen licenses have been allocated in total. In addition, the resource brokers for the application nodes A and B have respectively allocated a further license, so that—in theory—only one license can now be allocated in the whole network. Nevertheless, the resource broker for the application node A can still book two licenses, in the case of B a further two licenses and in the case of the application node C three licenses. If it is assumed that such license demands are actually made before the next synchronization steps, the state shown in FIG. 5B is obtained no later than after the next two synchronization cycles, that is to say in the state of full synchronization. The number of releasable licenses ("available=−4") is negative ("−4") both in the resource store and in the individual resource brokers. The method can react to this state using various strategies; in this exemplary embodiment, a plurality of strategies are used. A first reaction option is that the synchronization of the resource brokers is performed more frequently so that any licenses released in the meantime can be used again throughout the system as quickly as possible. Instead of a shortened time interval for the synchronization steps, the resource brokers for the application nodes A, B, C may also be set such that any released license is immediately reported to the resource store RS, however. In addition, the resource brokers may be set such that licenses are allocated only if the respective resource brokers store a positive value for the releasable licenses. Alternatively, the resource brokers can also be set such that "absent" licenses can also be allocated within predetermined limits and for a prescribed "tolerance time", however. In a worst case, as shortly after a system start, for example, in combination with a long synchronization interval and a maximum network load, the number of licenses allocated "too much" may reach the number of application nodes multiplied by the total number of Licenses—1.

Figure 6:
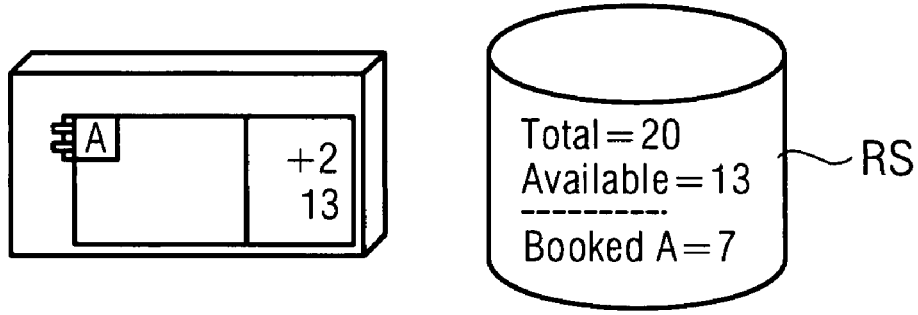
FIG. 6 shows a special case with just one application node.

FIG. 6 shows the special case in which precisely one resource broker is present. In such a case, the synchronization process is required only in order to make licenses recently added to the resource store RS in the meantime available and to remove licenses taken from said resource store from the resource broker too. The "tolerance mechanisms" just described, which, even with long synchronization cycles, ensure that the resource broker can actually allocate all "purchased" licenses, are not necessary in this scenario.

Figure 7:
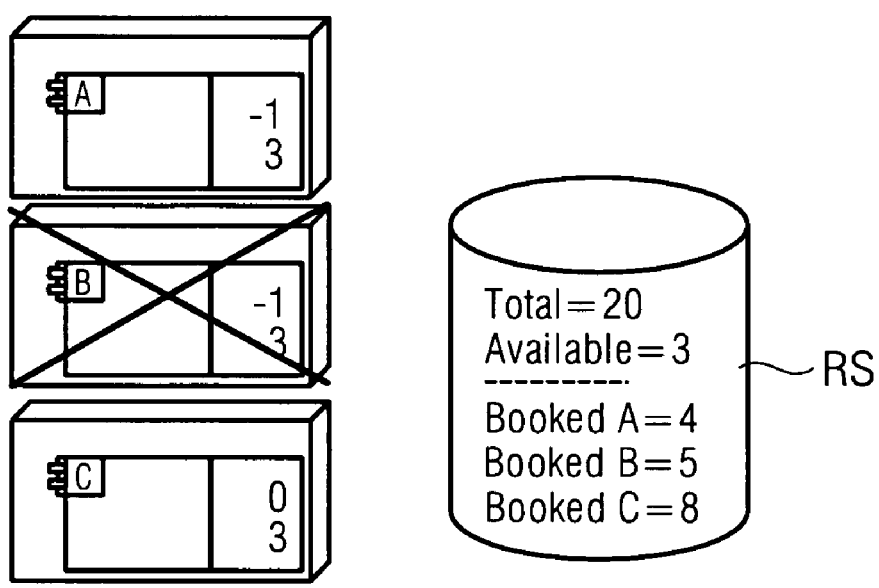
FIG. 7 shows a scenario with failure of an application node.

Finally, FIG. 7 shows the case in which an application node B and hence the resource broker installed there fail. FIG. 7 shows that the resource broker for the application node B has provided a further resource with a further license before it fails and after the last synchronization step; this is shown by the number "−1" in the top column of the central block in the figure. At the time of failure, the resource store contains the information that five licenses have been allocated at the application node B, because this corresponds to the state of affairs for the last synchronization.

The failure of application node B is registered by a monitoring facility ("watchdog"). Registration of the failure can lead to various reactions, for example the monitoring facility can attempt to restart the application node B. If this attempt is unsuccessful, it is assumed that the resources managed by B are likewise unattainable or have failed. This assessment is realistic particularly in cases in which a resource needs to renew or confirm a license which is in use at periodic intervals of time. In the light of this assumption, the number of booked licenses attributed to the application node B in the resource store RS "booked B=5" is deleted; the allocated licenses are thus released again in the entire system. After the next full synchronization cycle, these licenses are thus available again to the resource brokers for the application nodes A & C. The possibility described further above, that resources send their license requests to other resource brokers in the event of a resource broker or the associated hardware failing, results in automatic "load balancing", that is to say automatic load redistribution, taking place, with all further license requests being sent to the resource brokers for the application nodes A & C. This continues until the resource broker for the application node B can be obtained again; during the next synchronization cycles and during the next resource use and resource release operations which then occur and the associated allocation and release actions for the licenses, the license distribution in the entire system will "settle" back to a normal state.

The measures described above ensure that largely disturbance-free continued operation of resources is ensured even in the event of individual failure by application nodes A, B, C and/or by the resource store RS. Furthermore, the concept of local allocation of licenses avoids frequent data interchange with a central entity (in this case: resource store RS), which minimizes network load further.

The invention claimed is:

1. A method for managing a plurality of licenses comprising:
   providing a plurality of first licenses, each first license being able to be repeatedly allocated and released;
   providing a plurality of first resources, each first resource requiring one of the plurality of first licenses to be allocated to the first resource for the first resource to be used, each first resource releasing the first license following use of the first resource;
   registering a number of first licenses available in a first entity;
   allocating a first license from the plurality of first licenses via one of at least one second entity when the first resource is to be used;
   releasing the allocated first license via the one of the at least one second entity when the first resource is no longer being used; and
   repeatedly synchronizing license information between the first entity and each of the at least one second entity, via a synchronization comprising:
      reporting from each of the at least one second entity to the first entity a difference between a number of first licenses allocated via the at least one second entity and a number of first licenses released via the at least one second entity since a previous synchronization,
      updating the number of first licenses available in the first entity by using the reported difference from the at least one second entity, and
      reporting from the first entity to each of the at least one second entity the updated number of first licenses available and updating the number of first licenses available in each of the at least one second entity by using the reported updated number of first licenses.

2. The method as claimed in claim 1, wherein the at least one second entity is a plurality of second entities and the synchronization is repeated in succession with each of the plurality of second entities.

3. The method as claimed in claim 2, wherein the synchronization is repeated in a prescribed time frame.

4. The method as claimed in claim 3, wherein when the number of licenses available in the first entity, in at least one of the plurality of second entities, or in the first entity and at least one of the plurality of second entities is below a threshold value, the synchronization is performed more frequently than prescribed in the time frame.

5. The method as claimed in claim 2, wherein each first resource is allocated to precisely one respective second entity of the plurality of second entities.

6. The method as claimed in claim 2, wherein when one of the plurality of second entities is unattainable, each first resource allocated to the unattainable second entity is allocated to another of the plurality of second entities.

7. The method as claimed in claim 2, wherein the first entity, the plurality of second entities, or the first entity and the plurality of second entities are preset such that for a predefined period of time the number of first licenses allocated may exceed the number of first licenses available.

8. The method as claimed in claim 7, wherein the predefined period of time is a period up to a conclusion of the synchronization.

9. The method as claimed in claim 7, wherein the number of first licenses allocated may exceed the number of licenses available by a prescribed amount.

10. The method as claimed in claim 2, wherein the plurality of second entities are configured to immediately report the release of any of the plurality of first licenses to the first entity.

11. The method as claimed in claim 2, wherein one of the plurality of second entities may not allocate a first license unless the number of first licenses available in the one of the plurality of second entities is a positive number.

12. The method as claimed in claim 1, wherein prior to use, one of the plurality of first resources prompts allotment of a first license via the one of the at least one second entity to which the first resource is allocated, and wherein when at least one first license is registered in the one of the at least one second entity to which that at least one first resource is allocated, that second entity allots one of the plurality of first licenses to the prompting first resource, the allotted first license being blocked from allotment to further first resources until the allotted first license is released by the first resource using the allotted first license.

13. The method as claimed in claim 1 also comprising:

providing a plurality of second licenses, each second license being able to be repeatedly allocated and released;

providing a plurality of second resources, each second resource requiring one of the plurality of second licenses to be allocated to the second resource for the second resource to be used, each second resource releasing the second license following use of the second resource;

registering a number of second licenses available in the first entity;

allocating a second license from the plurality of second licenses via one of the at least one second entity when the second resource is to be used; and releasing the allocated second license via the one of the at least one second entity;

wherein the plurality of first licenses and the plurality of second licenses are managed separately by the first entity and the at least one second entity.

14. An apparatus for managing licenses, comprising:

a plurality of first licenses, each first license being able to be repeatedly allocated and released;

a plurality of first resources, each first resource requiring one of the plurality of first licenses to be allocated to the first resource for the first resource to be used, each first resource releasing the first license following use of the first resource;

a first entity having a first database for registering the plurality of first licenses and having a number of first licenses available; and a plurality of second entities, each second entity having a second database for managing the plurality of first licenses, each second entity having at least one of the plurality of first resources allocated thereto, each second entity allocating one of the plurality of first licenses to one of the first resources allocated to that second entity when that first resource is to be used, the allocated first license being released via the second entity when the allocated first resource is no longer being used, each second entity respectively performing a repeated synchronization with the first entity, the synchronization comprising:

reporting from each of the plurality of second entities to the first entity a difference between a number of first licenses allocated via the second entity and a number of first licenses released via the second entity since a previous synchronization, updating the number of first licenses available in the first entity by using the reported difference from each of the second entities, and reporting from the first entity to each of the plurality of second entities the updated number of first licenses available and updating the number of first licenses available in each of the plurality of second entities by using the reported updated number of first licenses.

15. The apparatus as claimed in claim 14, wherein prior to use, one of the plurality of first resources prompts allotment of a first license via the one of the plurality of second entities to which that first resource is allocated, and wherein when at least one first license is registered in one of the plurality of second entities to which that at least one first resource is allocated, that second entity allots one of the plurality of first licenses to the prompting first resource, the allotted first license being blocked from allotment to further first resources until the allotted first license is released by the first resource using the allotted first license.

16. The apparatus as claimed in claim 14 also comprising:

a plurality of second licenses, each second license being able to be repeatedly allocated and released;

a plurality of second resources, each second resource requiring one of the plurality of second licenses to be allocated to the second resource for the second resource to be used, each second resource releasing the second license following use of the second resource; and a plurality of second licenses available in the first entity;

wherein each of the plurality of second entities has at least one of the plurality of second resources allocated thereto, each second entity allocating one of the plurality of second licenses to a second resource allocated to the second entity when the second resource is to be used, the allocated second license being released via the second entity when the allocated second resource is no longer being used, and wherein the plurality of first licenses and the plurality of second licenses are managed separately by the first entity and the plurality of second entities.

17. The apparatus as claimed in claim 14, wherein the synchronization is repeated in a prescribed time frame.

18. The apparatus as claimed in claim 17, wherein when a number of licenses available in the first entity, in at least one of the plurality of second entities, or in the first entity and at least one of the plurality of second entities is below a threshold value, the synchronization is repeated in a time frame that is shorter than the prescribed time frame.

19. The apparatus as claimed in claim 14, wherein each first resource is allocated to only one respective second entity of the plurality of second entities.

20. The apparatus as claimed in claim 14, wherein when one of the plurality of second entities is unattainable, each first resource allocated to the unattainable second entity is allocated to another of the plurality of second entities.

21. The apparatus as claimed in claim 14, wherein the first entity, the plurality of second entities, or the first entity and the plurality of second entities are preset such that for a predefined period of time the number of first licenses allocated may exceed the number of first licenses available by a prescribed amount.

22. The apparatus as claimed in claim 21, wherein the predefined period of time is a period of time up to a conclusion of the synchronization.

23. The apparatus as claimed in claim 14, wherein the plurality of second entities are configured to immediately report the release of any of the plurality of first licenses to the first entity.

24. The apparatus as claimed in claim 14, wherein one of the plurality of second entities may not allocate a first license unless the number of first licenses available in that second entity is greater than zero.

* * * * *